(12) United States Patent
Andoralov et al.

(10) Patent No.: US 11,935,705 B2
(45) Date of Patent: Mar. 19, 2024

(54) ADVANCED POLYMER DISPERSION AND A CAPACITOR ON ITS BASE

(71) Applicant: KEMET Electronics Corporation, Fort Lauderdale, FL (US)

(72) Inventors: Victor Andoralov, Gränna (SE); Vania Pais, Évora (PT); Débora Sá, Évora (PT); Rui A. Monteiro, Évora (PT)

(73) Assignee: KEMET Electronics Corporation, Fort Lauderdale, FL (US)

( * ) Notice: Subject to any disclaimer, the term of this patent is extended or adjusted under 35 U.S.C. 154(b) by 0 days.

(21) Appl. No.: 17/948,437

(22) Filed: Sep. 20, 2022

(65) Prior Publication Data

US 2023/0095299 A1 Mar. 30, 2023

Related U.S. Application Data

(60) Provisional application No. 63/249,225, filed on Sep. 28, 2021.

(51) Int. Cl.
*H01G 9/028* (2006.01)
*H01G 9/07* (2006.01)

(52) U.S. Cl.
CPC ............. *H01G 9/028* (2013.01); *H01G 9/07* (2013.01)

(58) Field of Classification Search
CPC ........... H01G 11/48; H01G 9/07; H01G 9/028
See application file for complete search history.

(56) References Cited

U.S. PATENT DOCUMENTS

| | | | |
|---|---|---|---|
| 6,410,616 B1 * | 6/2002 | Harada | ..................... C08J 3/12 523/337 |
| 8,699,208 B2 | 4/2014 | Merker et al. | |
| 10,074,490 B2 | 9/2018 | Chacko et al. | |
| 10,381,167 B2 | 8/2019 | Chacko et al. | |
| 2010/0208545 A1 | 8/2010 | Ando et al. | |
| 2010/0280165 A1 | 11/2010 | Terrenoire et al. | |
| 2017/0253743 A1 | 9/2017 | Yezek et al. | |
| 2018/0136533 A1 | 5/2018 | Telfer et al. | |
| 2018/0230410 A1 | 8/2018 | Scheuing et al. | |
| 2020/0035171 A1 | 1/2020 | Telfer et al. | |

FOREIGN PATENT DOCUMENTS

| | | | |
|---|---|---|---|
| JP | 08276122 A | * | 10/1996 |
| JP | 2004061831 A | * | 2/2004 |

OTHER PUBLICATIONS

ISA/US; International Search Report and Written Opinion prepared for PCT/US2022/044073, dated Mar. 8, 2023.

* cited by examiner

*Primary Examiner* — David M Sinclair
(74) *Attorney, Agent, or Firm* — Joseph T. Guy; Patent Filing Specialist Inc.

(57) ABSTRACT

The present invention is related to a polymer dispersion comprising first conductive polymer particles having a positive Z-potential and second conductive polymer particles having a negative Z-potential, a method of forming the polymer dispersion, a method of making a capacitor comprising the polymer dispersion and a capacitor comprising the polymer dispersion.

42 Claims, 10 Drawing Sheets

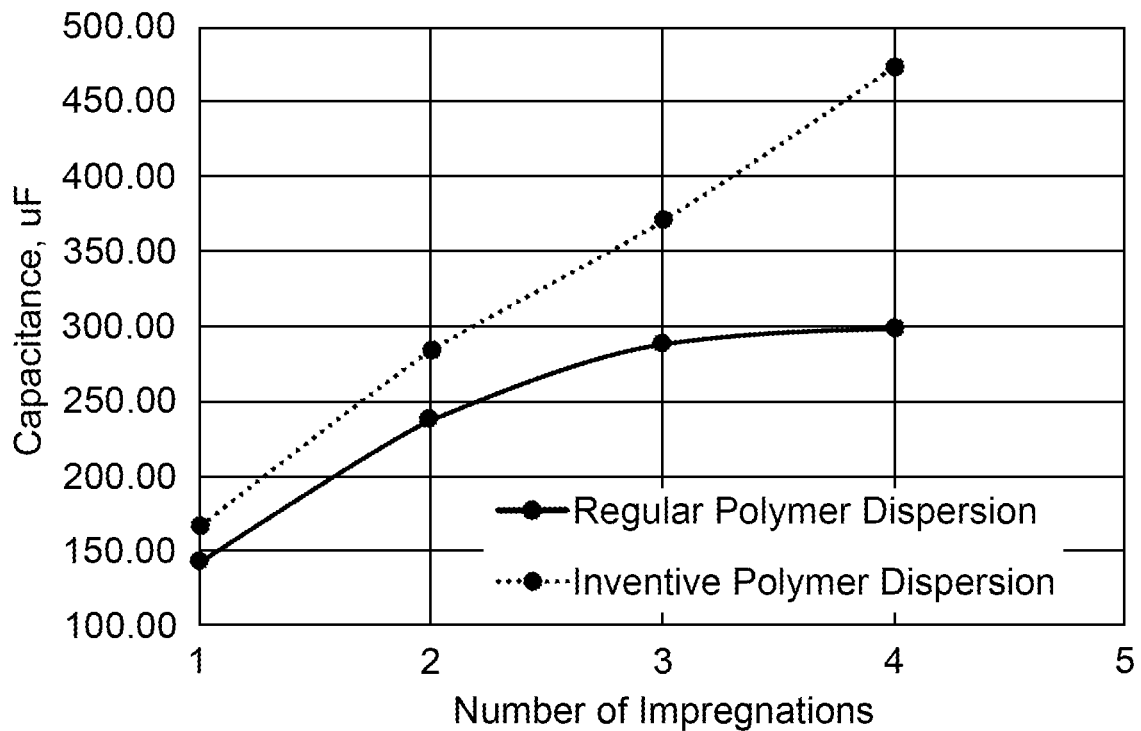
Fig. 10
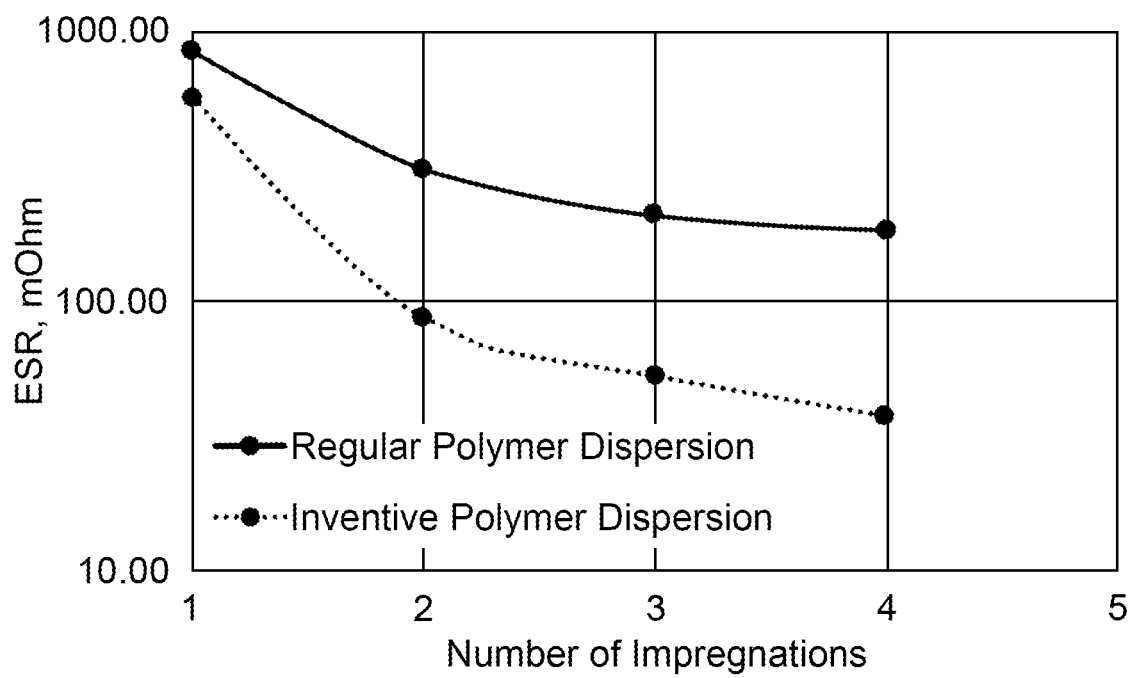

ADVANCED POLYMER DISPERSION AND A CAPACITOR ON ITS BASE

CROSS-REFERENCE TO RELATED APPLICATIONS

The present invention claims priority to U.S. Provisional Patent Application No. 63/249,225 filed Sep. 28, 2021 which is incorporated herein by reference.

FIELD OF THE INVENTION

The present invention is related to an improved dispersion which is particularly suitable for use in the manufacture of an electrolytic capacitor having improved capacitance and ESR.

BACKGROUND

Conducting polymers are widely used in solid electrolyte capacitors. High voltage and high reliability capacitors are manufactured using conducting polymer from dispersions wherein solid phase polymer particles are distributed in liquid phase solvent(s). The preparation of dispersions is known specifically for use in the manufacture of electrolytic capacitors. The focus in the art has been primarily on either the particle size of the polymer in the dispersion, as evidenced in U.S. Pat. No. 8,699,208 which is incorporated herein by reference, or on the final structure of the polymer layers in the capacitor, as evidenced in U.S. Pat. Nos. 10,381,167 and 10,074,490 both of which are incorporated herein by reference. The first approach has a significant big drawback in that the particle size range is assumed to be the only limiting factor of capacitor anode modification but there are other factors not previously appreciated.

In spite of the advances, the industry continues to demand better performance from polymer-based capacitors. There has been a particular demand for improved performance with regards to the compatibility of formed conductive polymers used in combination with liquid electrolytes, referred to as hybrid capacitors, at extended temperature ranges such as 125-165° C. This is important for hybrid electrolytic capacitors where the solid-state polymer is present in the capacitor with a liquid electrolyte at the same time. There is also a trend towards miniaturization of electrolytic capacitors which has become more easily obtained through the use of highly conducting polymers. Nevertheless, further advances are required to meet the demands and to achieve the required capacitance. Thus, a high degree of coverage of the dielectric layer on the anode surface becomes very important to achieve.

It has not been previously realized that the Z-potential of the conducting polymer can have an adverse effect on the coating quality on the surface of the dielectric. As illustrated schematically in FIG. 1, conductive polymer particles of opposite charge are attracted to the surface of the dielectric, represented in this graphic without limit thereto, as negatively charged polymer particles being attracted to the positively charged surface. As the surface coating increases the charge of the surface is gradually reversed which inhibits further formation of additional polymer particles in the coating. The subsequent polymer particles are less likely to be adsorbed from the solution and therefore they cannot contribute to the continued building of the coating. Upon drying forces polymer particles can be deposited with an interlaced salt layer, with counter ions compensating for the same charge which weakens the integrity of the coating. The result is the potential for delamination due to affinity of the small counter ions to solvation by electrolyte, in a hybrid capacitor, or moisture, in a solid electrolyte capacitor. Therefore, the coating quality is effectively limited resulting in defects.

The present invention provides an improved surface coating and therefore an improved capacitor.

SUMMARY OF THE INVENTION

The present invention is related to an improved dispersion wherein the improved dispersion provides superior coatings on a charged surface.

More specifically, the present invention is related to improved capacitors, particularly hybrid capacitors, wherein dispersion of conductive polymer comprising a combination of positive Z-potential polymer particles and negative Z-potential polymer particles provide superior performance.

A particular feature of the invention is the ability to form a capacitor comprising improvements in capacitance and equivalent series resistance (ESR).

These and other embodiments, as will be realized, are provided in a polymer dispersion comprising first conductive polymer particles having a positive Z-potential and second conductive polymer particles having a negative Z-potential.

Yet another embodiment is provided in a method for forming a polymer dispersion. The method of forming a polymer dispersion comprises: providing a conductive polymer dispersion wherein the conductive polymer comprises a conductive polymer in a bipolaron state;
subjecting the conductive polymer dispersion to high-pressure homogenization thereby converting the conductive polymer into first polymer particles having a positive Z-potential and second polymer particles having a negative Z-potential.

Yet another embodiment is provided in a method for forming a capacitor. The method comprises:
forming an anode;
forming a dielectric on the anode; and
forming a conductive polymer layer on the dielectric by applying a dispersion comprising first polymer particles having a positive Z-potential and second polymer particles having a negative Z-potential.

Yet another embodiment is provided in a capacitor comprising an anode, a dielectric on the anode, and a conductive polymer layer on the dielectric wherein the conductive polymer layer comprises first conductive polymer particles having a positive Z-potential and second conductive polymer particles having a negative Z-potential.

BRIEF DESCRIPTION OF FIGURES

FIG. 10 graphically illustrates the advantages of the invention.

DESCRIPTION

The present invention is related to an improved dispersion which is particularly suitable for use in the manufacture of an electrolytic capacitor, particularly the cathode of an electrolytic capacitor, wherein the capacitor exhibits improved capacitance and improved ESR. More specifically, the present invention is related to a dispersion comprising first polymer particles with a positive Z-potential and second polymer particles with a negative Z-potential and capacitors comprising the dispersion.

The invention will be described with reference to the figures which form an integral part of the disclosure provided for clarification without limiting the invention.

Figure 1:
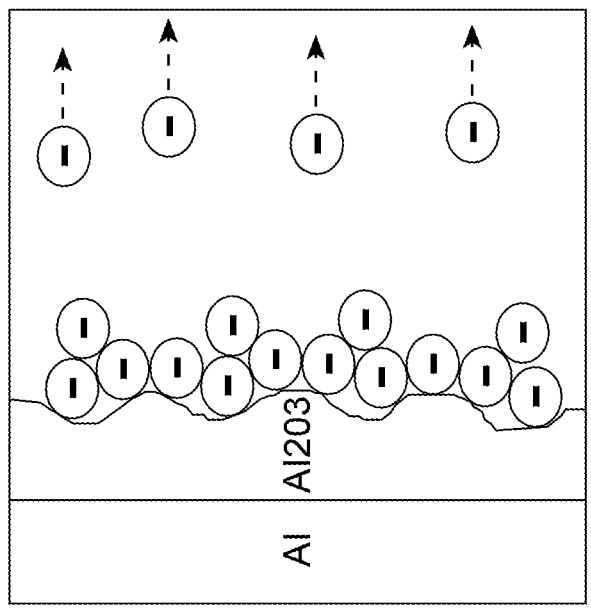
FIG. 1 schematically illustrates coating the prior art.
Figure 1:
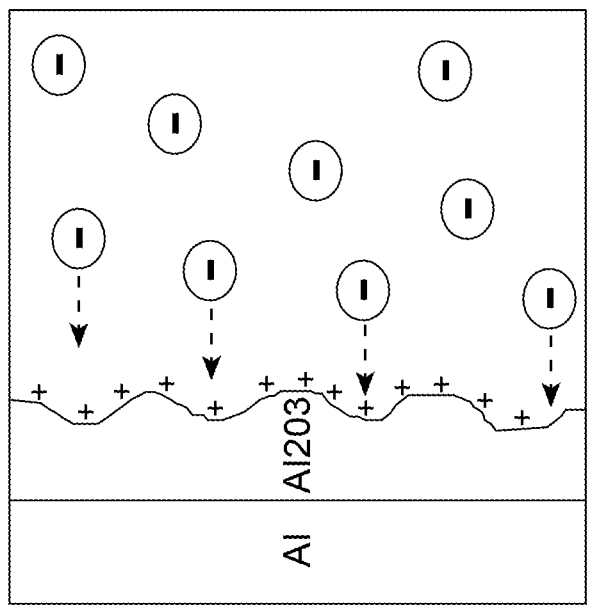
Figure 2:
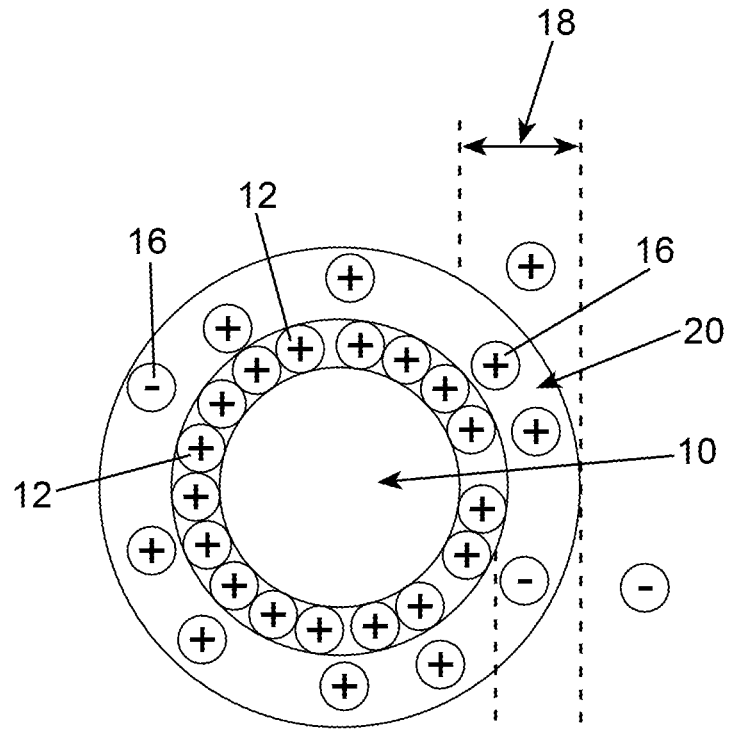
FIG. 2 schematically illustrates a Z-negative polymer particle.
Figure 2:
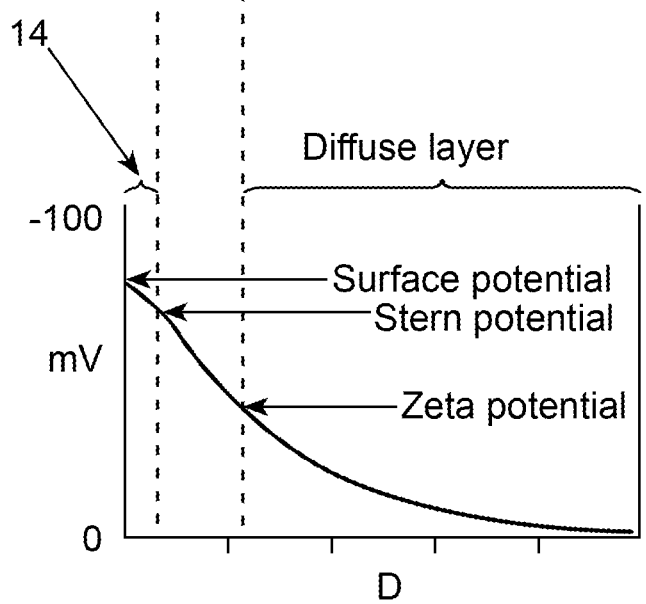

A positive Z-particle is illustrated schematically in FIG. 2. In FIG. 2, the core, 10, is a polymer particle with a negatively charged surface having a surface potential, SP. Positive polymer particles, 12, are electrostatically attracted to the surface thereby forming a coating and converting the surface to a positively charged surface for the coated polymer particle. The thickness of the coated layer, as measured from the tangent of the core to the tangent of the positive polymer particles, is referred to as the Stern layer, 14. Nonbound positively charged polymer particles, 16, are unable to contribute to the coating due to electrostatic repulsion thereby creating an electrical double layer, 18, wherein the nonbound positively charge polymer particles are in a slipping plane, 20, of the electrical double layer. The area beyond the slipping plane is referred to as the diffuse layer. Representative potential, in mV, as a function of distance, D, from the polymer particle surface decreases as illustrated graphically in FIG. 2.

Figure 3:
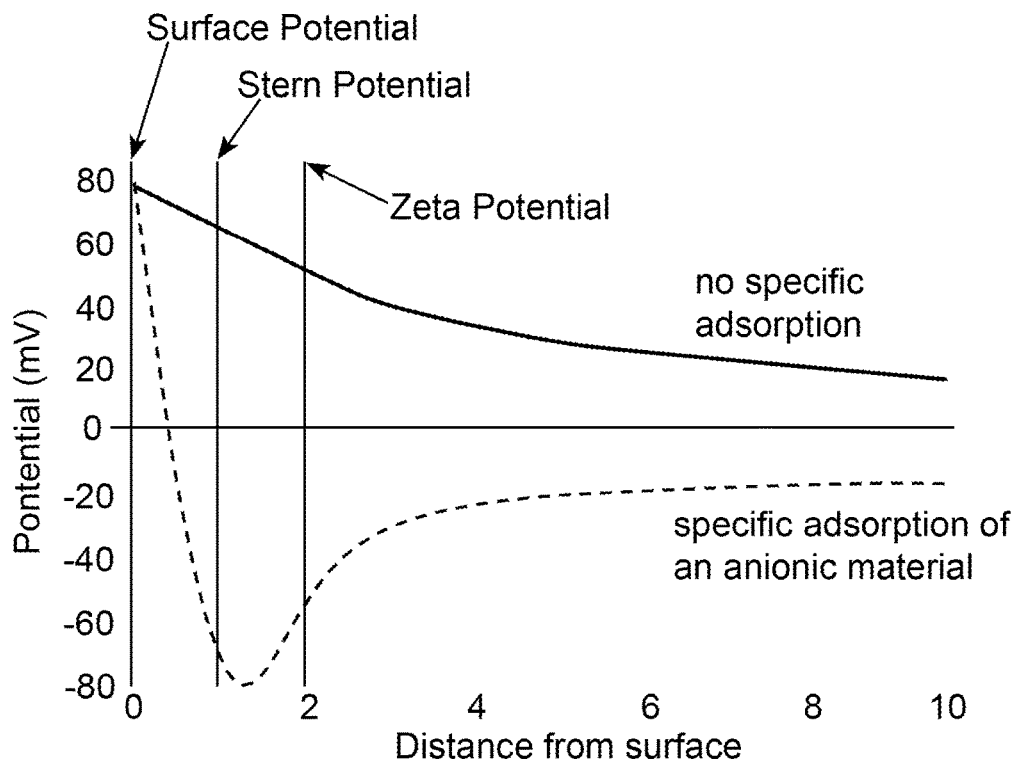
FIG. 3 graphically illustrates the potential distribution for a polymer particle with positive surface charge wherein positive Z-potential indicates absence of specific adsorption and negative Z-potential indicates specific adsorption of anions.

FIG. 3 graphically illustrates a representative potential distribution for a polymer particle with positive surface charge wherein positive Z-potential indicates absence of specific adsorption and negative Z-potential indicates specific adsorption of anionic material.

An embodiment of the invention will be described with reference to FIGS. 4A-4D. In FIGS. 4A-4D an improved coating, and process for forming the coating, is illustrated schematically. For the purposes of illustration, without limit thereto, the invention will be illustrated utilizing an aluminum metal with an aluminum oxide dielectric wherein the surface of the dielectric is in the pH range of 1 to 8, more preferably 3 to 8, and is positively charged as illustrated schematically in FIG. 4A. During a first modification, represented in FIG. 4B, the first layer of conductive polymer particles, having a charge which is opposite the surface or a negative Z-potential in this illustration, adsorb on the surface of the dielectric. Adhesion is supported by the electrostatic forces resulting in a reversal of the effective surface charge relative to the charge of the dielectric surface.

Figure 4B:
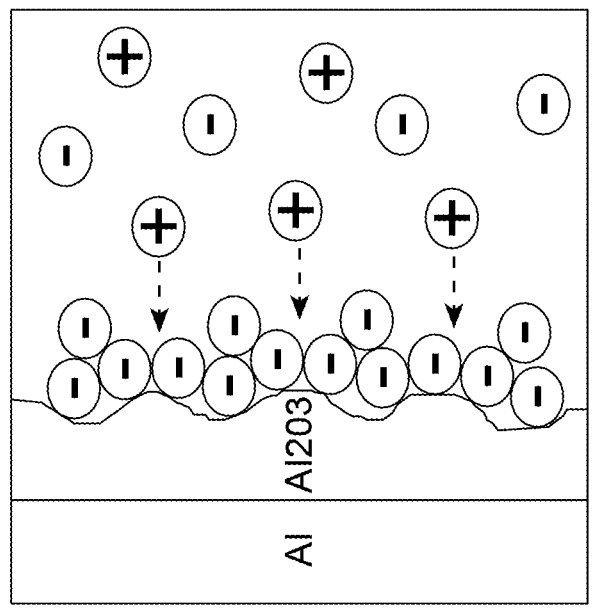
FIGS. 4A-4D schematically Illustrates an embodiment of the invention.
Figure 4A:
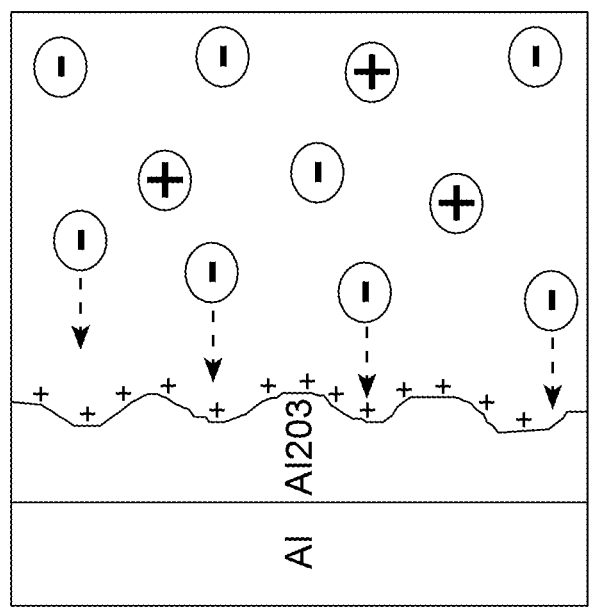
Figure 4D:
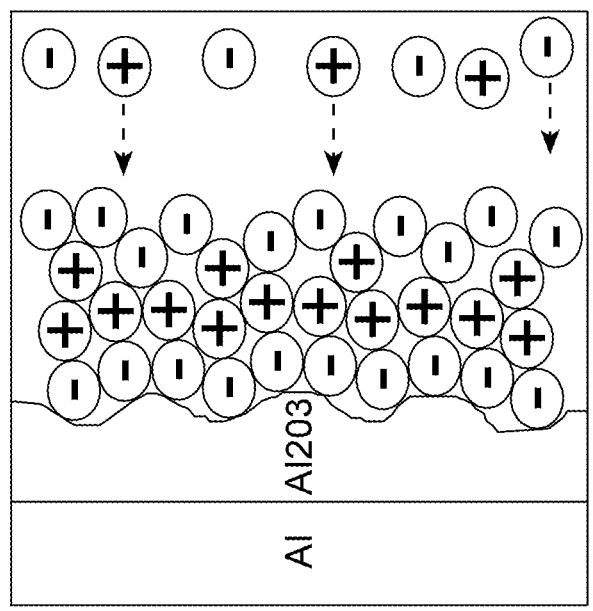
Figure 4C:
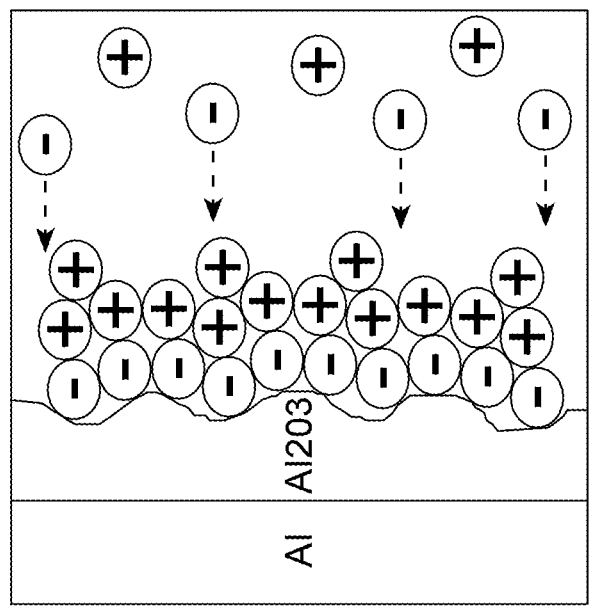

During a second modification, illustrated in FIG. 4C, a second layer of conductive polymer particles, having a charge opposite to the first layer or conductive polymer particles or a positive Z-potential in this illustration, are now attracted to the surface and adsorb on the surface thereby again reversing the effective surface charge. After a sufficient number of polymer particles of the second layer have formed a coating the polymer particles having a negative Z-potential, in this illustration, are again attracted to the surface as illustrated schematically in FIG. 4D.

As would be realized the process of alternating the effective charge surface results in a much thicker conductive coating, and therefore fewer coating defects, thereby providing improved capacitance and reduced ESR. The entire polymer layer thickness increases with each cycle and vacancies in the coating are significantly reduced or eliminated. The resulting polymer layer has better resistance towards delamination in the presence of electrolytes. The cycles can be repeated with drying and curing steps, if necessary, to form a uniform surface.

Figure 5:
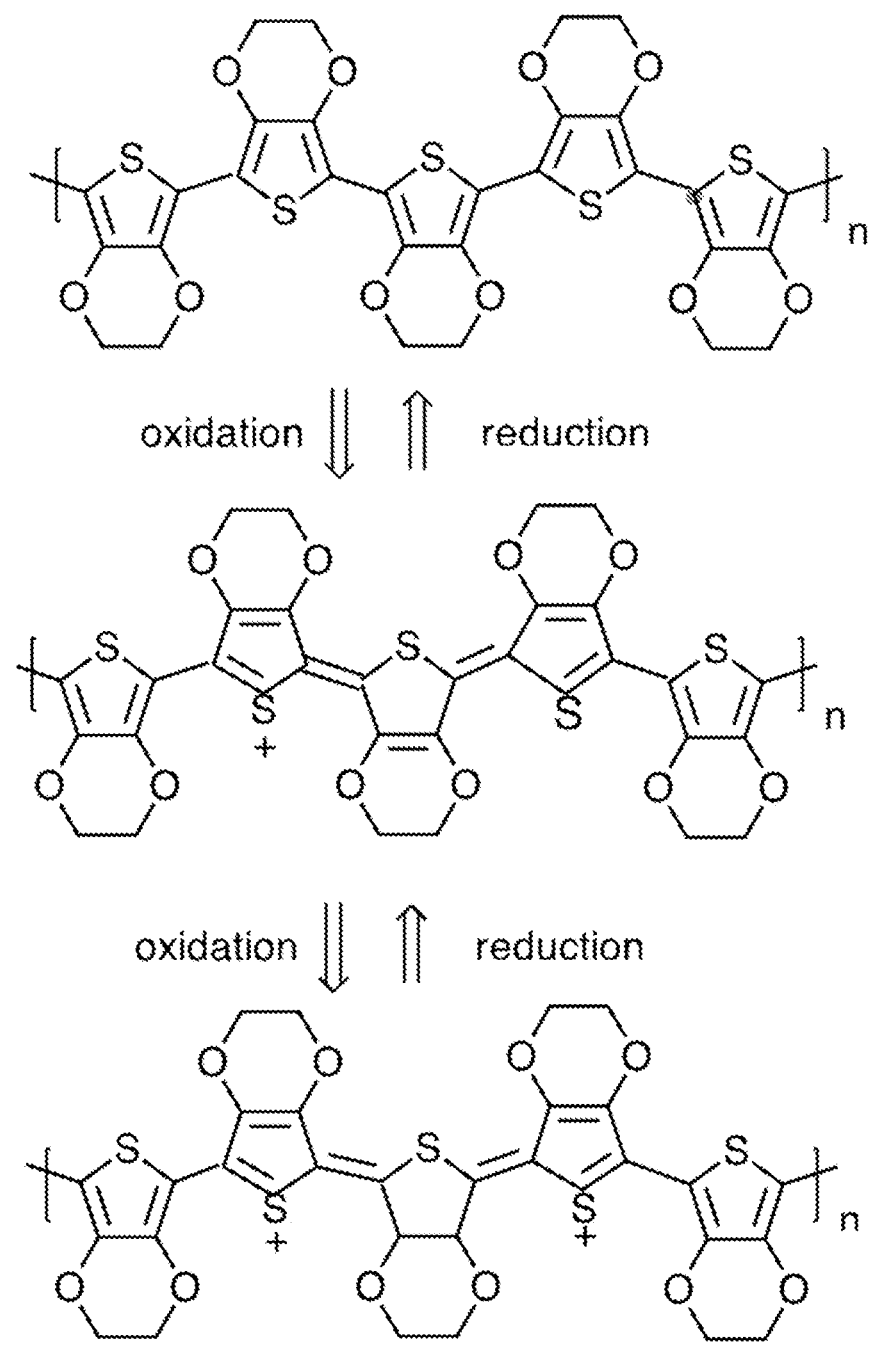
FIG. 5 illustrates a neutral state, polar state and bipolar state of a representative conductive polymer.

Dispersions comprising positive Z-potential conducting polymer particles and negative Z-potential conducting polymer particles are formed by high-pressure homogenization of a dispersion comprising a conductive polymer in a bipolaron state. Conjugated polymers demonstrate higher conductivity in the positive bipolaron state wherein the polymer is oxidized from the neutral state to the bipolar state as described in US Published Patent Application 2022/0059296 which is incorporated herein by reference. The polaron state is formed by chemical or electrochemical oxidation of the neutral polymer chain with further oxidation leading to the bipolaron state which for polythiophene, as a representative conductive polymer, is represented schematically in FIG. 5. In FIG. 5 the top structure is neutral, the central structure is a polaron and the bottom structure is a bipolaron.

The bipolaron state corresponds to a high degree of p-doping since the Fermi energy level is closer to the Highest Occupied Molecular Orbital (HOMO) energy level. For some conducting polymers a neutral chain can turn to a polaron or bipolaron through protonation, such as by treatment with low pH solutions, however this must be considered as an intramolecular oxidation by protons. With polyaniline (PAN) and polypyrole (PPY) conductive polymers electrons have to be accepted from low energy electron levels for a proton to be involved in the reaction and therefore the concentration should thermodynamically allow the process of "hole" generation from the accepted proton. If a proton is not involved, as in a dispersion comprising poly(3,4-ethylenedioxythiophene) (PEDOT) and polystyrene sulfonate (PSS), the polymer doping can be conducted only through intermolecular oxidation.

For the purposes of the instant disclosure high-pressure homogenization a process wherein the dispersion is passed through a homogenizer at a high pressure drop of 250 to 1000 bar.

An inventive polymer dispersion comprises conducting polymer particles having an average polymer particle size of at least 5 nm, more preferably at least 10 nm and more preferably at least 50 nm. Even more preferably the polymer particles have an average polymer particle size of 100-500 nm and more preferably 100-200 nm wherein polymer particle size is the diameter of a circle having the same mass as the polymer particle being measured. Polymer particles of this polymer dispersion have a core and a shell. The core is charged positively vs. the shell. Polymer particles of the polymer dispersion are fractionized in at least two different polymer particle types which have different surface composition and different Z-potential. Both polymer particle types are originated from a single polymer particle type dispersion, by high-pressure homogenization, with average polymer particle size prior to homogenization of from 100 nm to 5000 nm. After high-pressure homogenization the two polymer particle types having different Z-potentials are characterized by their PSS/PEDOT surface ratio with the higher PSS/PEDOT surface ratio representing a negative Z-potential polymer particle and the lower PSS/PEDOT surface ratio representing a positive Z-potential polymer particle.

Agglomeration of the positive Z-potential polymer particle and negative Z-potential polymer particle is suppressed by dilution. At dilution of 1 to 1000 polymer particle sizes are close to those measured using a CTS centrifuge. However, at dilutions lower than 1 to 50 the size is 5-6 times larger due to agglomeration wherein polymer particles with positive Z-potential get a recharged surface. Negative Z-potential polymer particles can be stabilized by salicylic acid adsorbed by the polymer particles. Salicylic acid in a small concentration can eliminate or significantly suppress the agglomeration process.

Z-potential can be measured for polymer particles of the dispersion using Dynamic Light Scattering methods. The Z-potential of positively charged polymer particles is preferably in the range of 10 mV to +150 mV and the Z-potential of negatively charged polymer particles is in the range of form 0 mV to −150 mV.

The difference in Z-potentials is preferably at least 20 mV when the dispersion is diluted about 500 times with deionized water. Both polymer particle types can interact in the dispersion forming agglomerates which are at least 4 times larger in size than the polymer particles.

An additive is optionally added to the inventive polymer dispersion to form an adjunct dispersion. The additive is specifically adsorbed in higher degree on the surface of the polymer particles which have higher Z-potential than on surface of the polymer particles having lower Z-potential thereby forming a modified polymer particle. Molecules or ions of the additive are negatively charged and change the Z-potential of the conducting polymer particles thereby decreasing the difference between Z-potential of the polymer particle types to less than 20 mV in the adjunct dispersion. The adjunct dispersion comprises at least two different polymer particle types have different surface composition but nearly equal Z-potential with difference not larger than 20 mV due to the incorporation of the additive.

The additive is an acid or salt which preferentially ligates to a polymer particle having a positive Z-potential. Preferred additives include aromatic acids or salts such as alts selected from the group consisting of salicylic acid, phthalic acid, benzoic acid and styrene-4-sulfonic acid. Other preferred additives include oligo or poly-acids or their salts such as acids selected from the group consisting of 2,3,4,4-tetrahydroxybutanoic acid, 1,2,3,4-butanetetracarboxylic acid and polystyrene sulfonic acid.

The inventive dispersion is particularly suitable for formation of an electrolytic capacitor comprising a polymeric cathode formed from the inventive dispersion. An electrolytic capacitor can be formed having a working voltage up to 500 volts by applying the inventive dispersion in multiple steps. The inventive dispersion is particularly suitable for forming capacitors having a working voltage of 35V-500V.

The adjunct dispersion, comprising an additive, is particularly suitable for forming a polymer electrolytic capacitor with a working voltage of 3V-35V. For the purposes of the invention the working voltage is defined as 80% of the break-down voltage wherein the break-down voltage is the average voltage that identically prepared capacitors fail.

While not limited to theory, it is hypothesized that the inventive dispersion allows the polymer particles to more effectively penetrate into small diameter channels of the dielectric and underlying foil or pressed powder.

Figure 6:
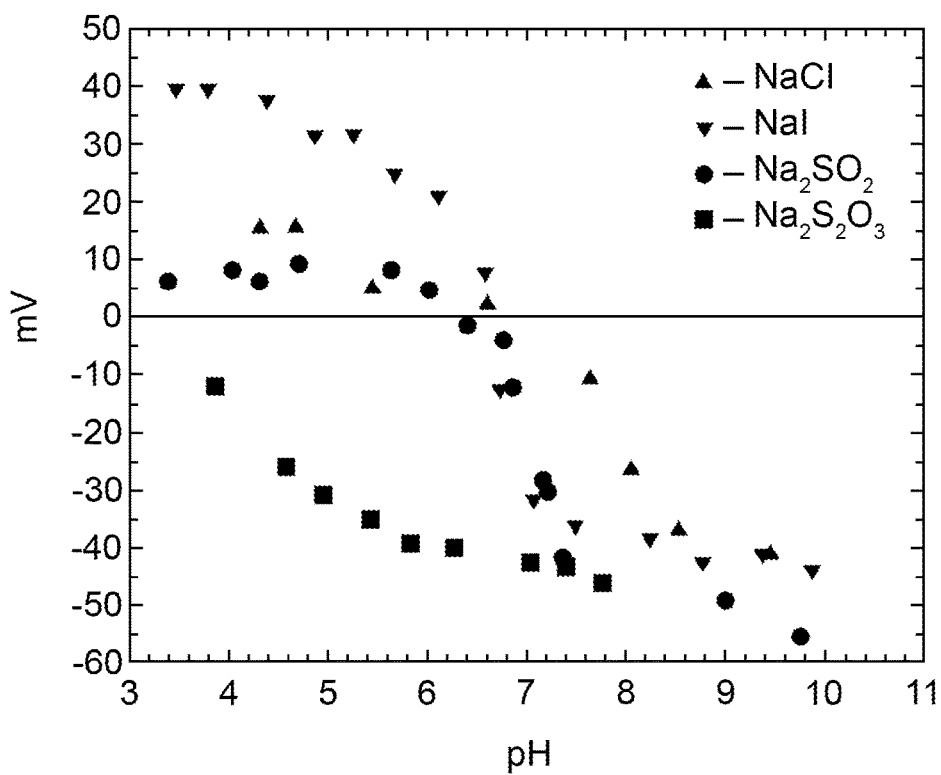
FIG. 6 graphically illustrates surface potential as a function of pH in the presence of different anions.

Surface charge of the dielectric can be altered by anions even at relatively low pH as illustrated graphically in FIG. 6. The presence of anions with specific adsorption to the alumina surface is negative at pH 3 and higher. In this case it is important to have Z-positive polymer particles in the polymer dispersion which allow a good interaction between the polymer particles and the dielectric surface resulting in an improved surface coverage and great adhesion between the polymer and the dielectric. As would be realized the capacitor dielectric surface charge can depend on solution pH and specific adsorption of anions or cations.

Figures 7A, 7B:
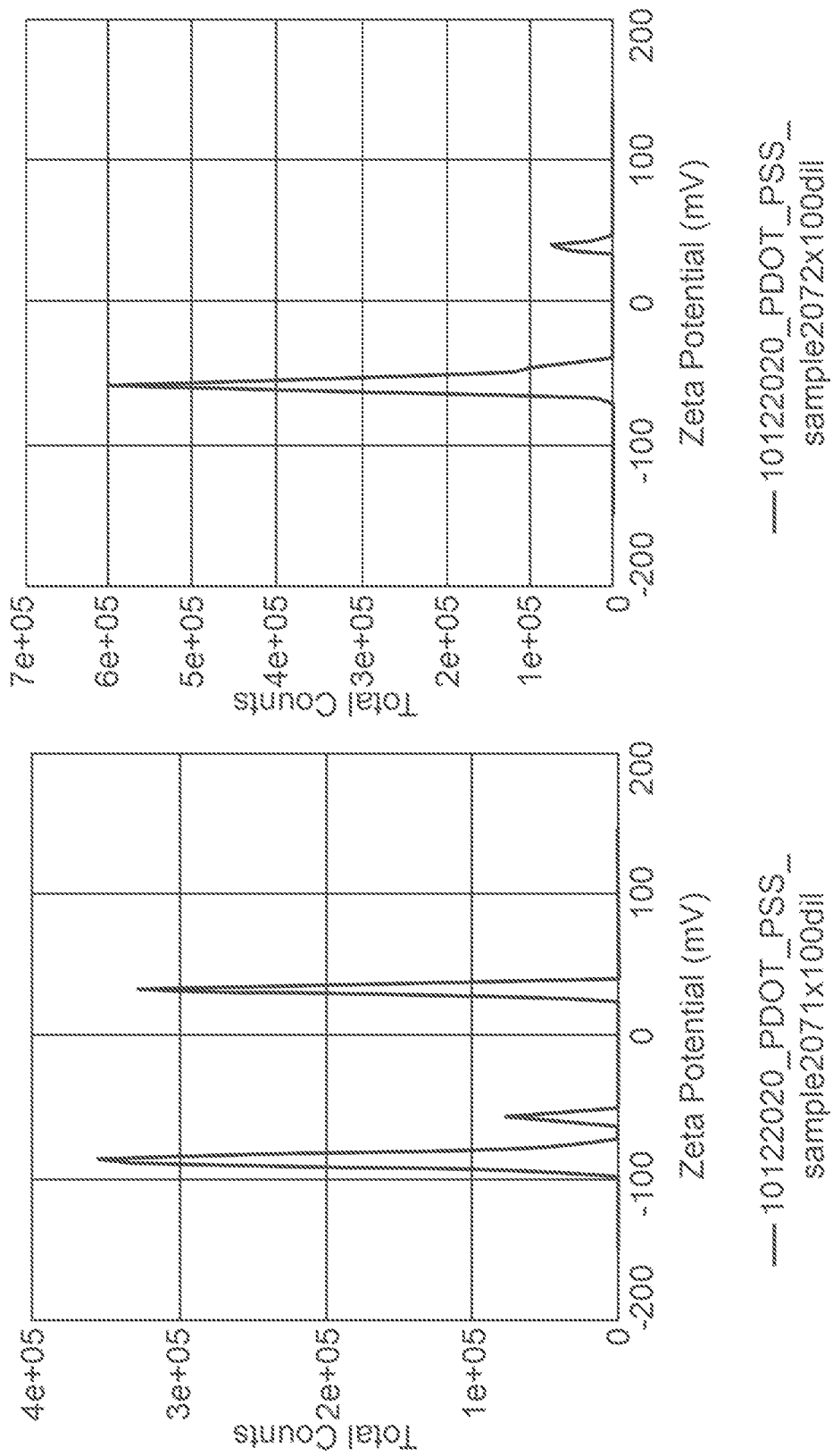
FIGS. 7A-7C graphically illustrates the invention.
Figure 7C:
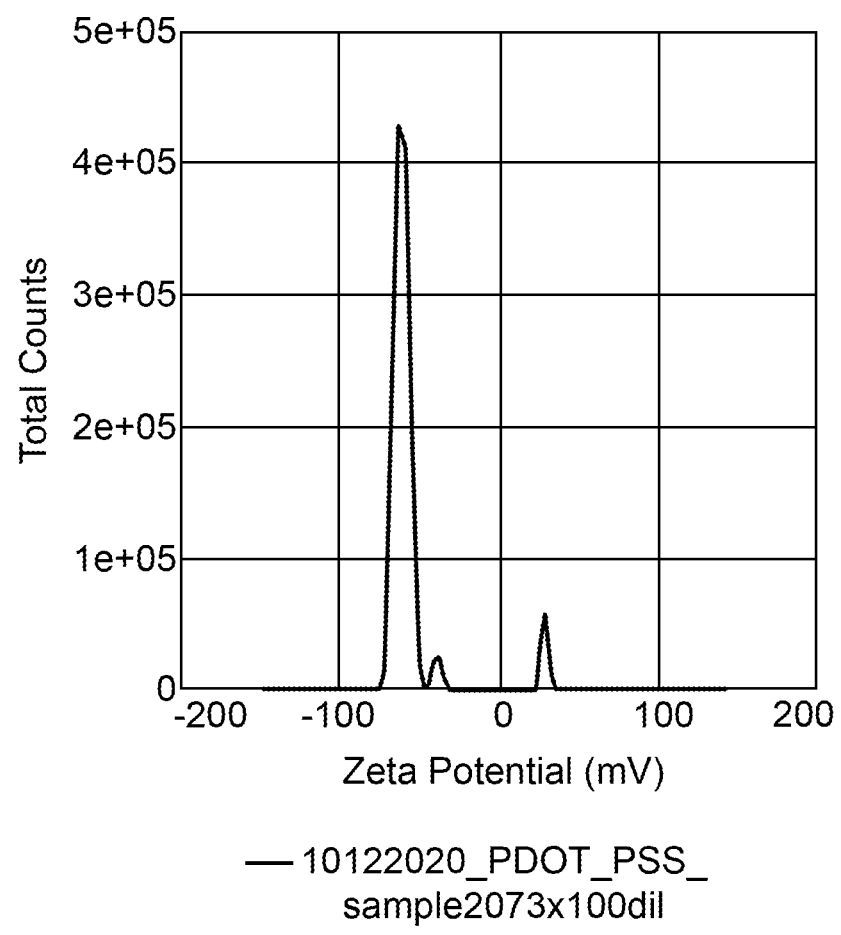

The Z-potential of representative dispersions in illustrated in FIGS. 7A-7C. The scans were obtained using a Zetasizer Ultra from Malvern Panalytical.

The polymer capacitor manufacturing often requires several deposition steps with drying and polymer curing stages in between the modifications. Modification of the dielectric can happen during a drying process of applied polymer dispersion on, or in, the capacitor element or material. During the drying stage the pH can change leading to a change of the dielectric surface potential. In this case if initially positively charged surface of alumina, for aluminium anode modification at pH lower than 7, the surface charge can become negative during modification which will affect adhesion of the negatively charged nano polymer particles of the polymer dispersion leading to poor surface coverage, lower final capacitance, higher ESR and decreased stability at different conditions such as low or high temperatures, charge/discharge, etc. The inventive dispersion provides protection against alterations of the dielectric during drying.

The problem related to low dielectric coverage with conducting polymer and poor electrolyte compatibility of highly conducting polymers in hybrid polymer capacitors is solved by the use of a dual Z-potential conducting polymer dispersion and a manufacturing method for polymer capacitor based on the dispersion.

The problem of poor dielectric coating and conducting polymer layer delamination, due to thermal or electrical stress leading to capacitance drop, in hybrid and solid polymer capacitors is also solved by the use of the inventive dual Z-potential conducting polymer dispersion and manufacturing method for polymer capacitor based on the dispersion.

Polymer particle surfaces can be charged positively or negatively for both Z-positive and Z-negative polymer particle types. Z-potential tuning can be done by changing the polymer particle charge or by specific adsorption of ionic components on the surface of the polymer particles.

EXAMPLES

Example 1

Dispersion A was prepared based on conducting polymer nanoparticles comprising poly(3,4-ethylenedioxythiophene) and polystyrene sulfonate (PEDOT/PSS) with oxidized core, positive core charge, and with excessive amount of polyanion assuring specific adsorption of the anion on the surface of the polymer particles or incorporation of the polyanions in the polymer particle surface. Dispersion B was prepared based on conducting polymer nanoparticles of PEDOT/PSS with an oxidized core, positive core charge, and with a lower polyanion/conducting polymer ratio where specific adsorption of the anion on the surface of the polymer particles or incorporation of the polyanions in the polymer particle surface are suppressed. Dispersion C was prepared by mixing Dispersion A and dispersion B. Polymer particles of both A and B types have positively charged core what prevents the polymer sedimentation even if Z-positive and Z-negative polymer particles form agglomerations with time dispersion in the final dispersion C.

Example 2

Example 2 was the same as Example 1 except that quantities of the polyanion are the same for Dispersion A and Dispersion B. Dispersion A was treated with a surface-active anionic substance of a low molecular weight, with salicylic acid being exemplary, to assure negative surface charge. Dispersion C was prepared by mixing Dispersion A and Dispersion B.

Figure 8:
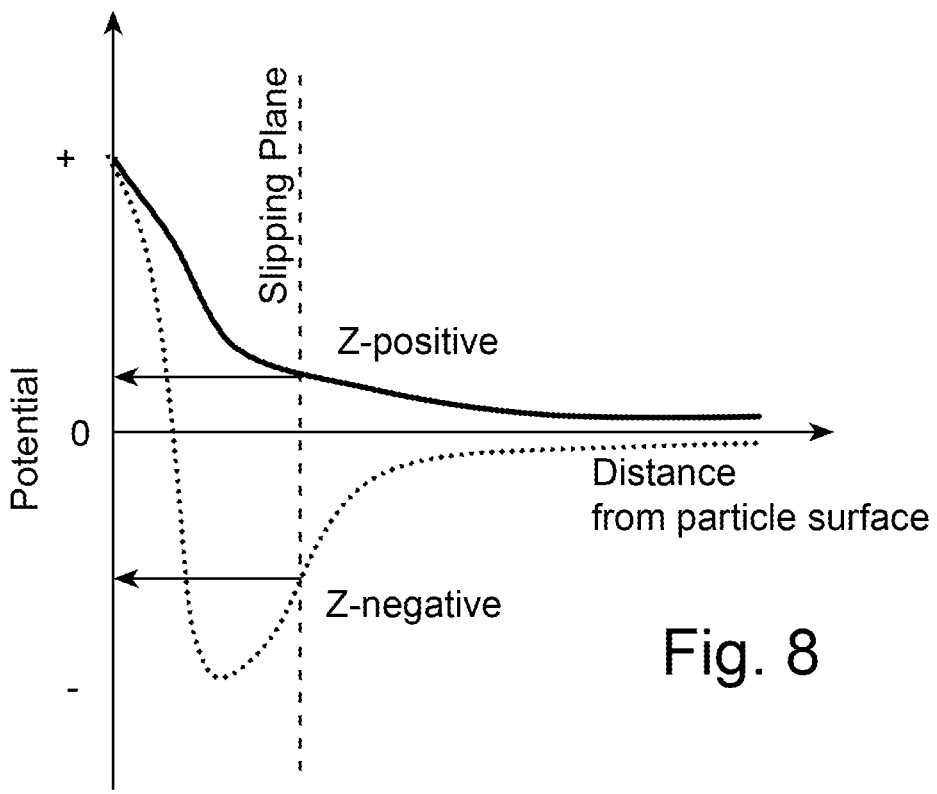
FIG. 8 graphically illustrates the invention.

FIG. 8 graphically illustrates normalized curves for Z-positive and Z-negative polymer particles from Examples 1 and 2.

Example 3

Dispersion A was prepared based on conducting polymer nanoparticles of PEDOT/PSS with higher degree oxidized core, higher positive charge of the core, and with an excessive amount of polyanion thereby assuring specific adsorption of the anion on the surface of the polymer particles or incorporation of the polyanions in the polymer particle surface. Dispersion B was prepared based on conducting polymer nanoparticles of PEDOT/PSS with less oxidized core, lower positive charge of core, and the same polyanion/conducting polymer ratio as applied for Dispersion A. Dispersion C was prepared by mixing Dispersion A and Dispersion B. Polymer particles of both A and B types have positively charged core that prevents the polymer sedimentation even if Z-positive and Z-negative polymer particles form agglomerations with time dispersion in the final dispersion C.

Figure 9:
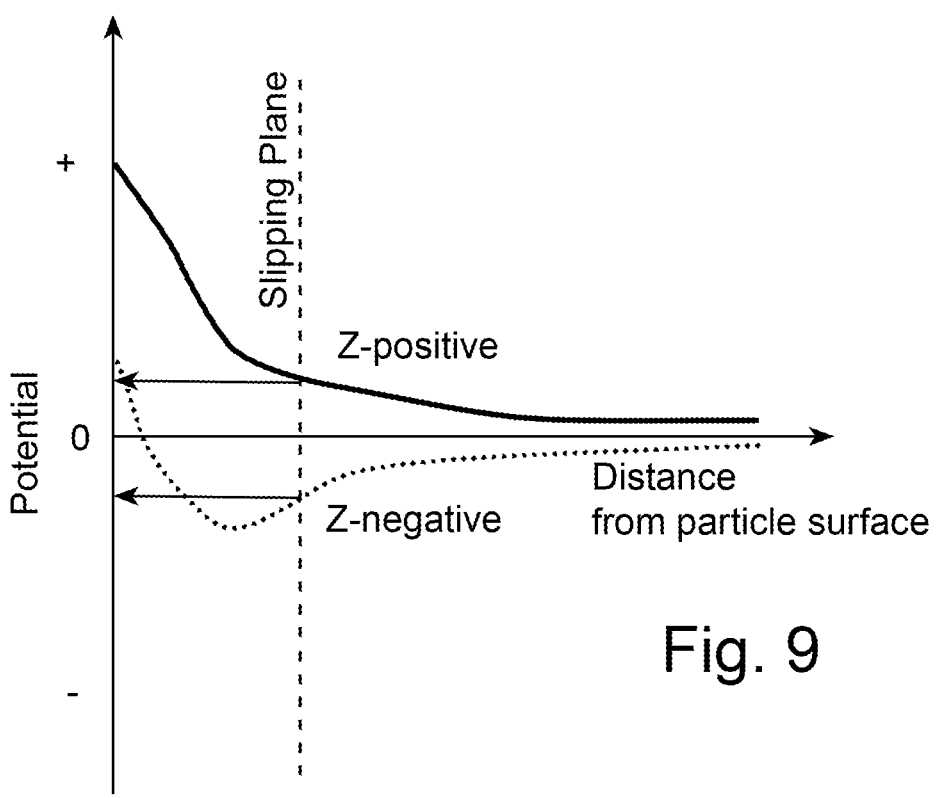
FIG. 9 graphically illustrates the invention.

FIG. 9 graphically illustrates normalized curves for Z-positive and Z-negative polymer particles from Example 3.

Method of Preparing a Capacitor

A capacitor was produced by applying of a polymer dispersion on a porous body of an electrode material comprising a dielectric on the surface of the electrode. The polymer dispersion comprised conducting polymer particles of at least two types wherein one has a positive Z-potential and the other one has a negative Z-potential. The polymer dispersion comprised conducting polymer particles with average polymer particle size, calculated as average based on number of polymer particles, at least 0.010 micro meters or larger but not larger than 0.5 micro meter.

A 6.3V working voltage capacitors was prepared using an inventive dispersion with salicylic acid. The capacitance yield and ESR showed significant as illustrated graphically in FIG. 10.

The invention has been described with reference to the preferred embodiments without limit thereto. One of skill in the art would realize additional embodiments and improvements which are not specifically stated but which are within the meets and bounds of the claims appended hereto.

The invention claimed is:

1. A polymer dispersion comprising first polymer particles having a positive Z-potential and second polymer particles having a negative Z-potential wherein said first polymer particles comprise a conducting polymer.

2. The polymer dispersion of claim 1 wherein said first polymer particles have a charge of 10 mV to +150 mV and said second polymer particles have a charge of 0 mV to −150 mV.

3. The polymer dispersion of claim 1 wherein said first polymer particles and said second polymer particles have a charge difference of at least 20 mV.

4. The polymer dispersion of claim 1 wherein said first polymer particles and said second polymer particles have an average particle size of at least 5 nm.

5. The polymer dispersion of claim 4 wherein said first polymer particles and said second polymer particles have an average particle size of at least 10 nm.

6. The polymer dispersion of claim 5 wherein said first polymer particles and said second polymer particles have an average particle size of at least 50 nm.

7. The polymer dispersion of claim 6 wherein said first polymer particles and said second polymer particles have an average particle size of 100-500 nm.

8. The polymer dispersion of claim 7 wherein said first polymer particles and said second polymer particles have an average particle size of 100-200 nm.

9. The polymer dispersion of claim 1 further comprising an additive wherein said additive adheres to said first polymer particles thereby forming an adjunct dispersion.

10. The polymer dispersion of claim 9 wherein said adjunct dispersion comprises modified first polymer particles wherein said modified first polymer particles and said second polymer particles have a charge difference of less than 20 mV.

11. The polymer dispersion of claim 9 wherein said additive is an aromatic acid or salt.

12. The polymer dispersion of claim 11 wherein said additive is selected from the group consisting of salicylic acid, phthalic acid, benzoic acid and styrene-4-sulfonic acid.

13. A polymer dispersion comprising first polymer particles having a positive Z-potential and second polymer particles having a negative Z-potential further comprising an additive wherein said additive adheres to said first polymer particles thereby forming an adjunct dispersion wherein said additive is an aromatic acid or salt wherein said additive is selected from the group consisting of 2,3,4,4-tetrahydroxybutanoic acid, 1,2,3,4-butanetetracarboxylic acid and polystyrene sulfonic acid.

14. A method for forming a capacitor comprising:
    forming an anode;
    forming a dielectric on said anode;
    forming a solid conductive polymer layer on said dielectric by applying a dispersion comprising first polymer particles having a positive Z-potential and second polymer particles having a negative Z-potential.

15. The method for forming a capacitor of claim 14 wherein said first polymer particles have a charge of 10 mV to +150 mV and said second polymer particles have a charge of 0 mV to −150 mV.

16. The method for forming a capacitor of claim 14 wherein said first polymer particles and said second polymer particles have a charge difference of at least 20 mV.

17. The method for forming a capacitor of claim 14 wherein said first polymer particles and said second polymer particles have an average particle size of at least 5 nm.

18. The method for forming a capacitor of claim 17 wherein said first polymer particles and said second polymer particles have an average particle size of at least 10 nm.

19. The method for forming a capacitor of claim 18 wherein said first polymer particles and said second polymer particles have an average particle size of at least 50 nm.

20. The method for forming a capacitor of claim 19 wherein said first polymer particles and said second polymer particles have an average particle size of 100-500 nm.

21. The method for forming a capacitor of claim 20 wherein said first polymer particles and said second polymer particles have an average particle size of 100-200 nm.

22. The method for forming a capacitor of claim 14 further comprising an additive wherein said additive adheres to said first polymer particles thereby forming an adjunct dispersion.

23. The method for forming a capacitor of claim 22 wherein said adjunct dispersion comprises modified first polymer particles wherein said modified first polymer particles and said second particles have a charge difference of less than 20 mV.

24. The method for forming a capacitor of claim 22 wherein said additive is an aromatic acid or salt.

25. The method for forming a capacitor of claim 24 wherein said additive is selected from the group consisting of salicylic acid, phthalic acid, benzoic acid and styrene-4-sulfonic acid.

26. A method for forming a capacitor comprising:
forming an anode;
forming a dielectric on said anode;
forming a conductive polymer layer on said dielectric by applying a dispersion comprising first polymer particles having a positive Z-potential and second polymer particles having a negative Z-potential further comprising an additive wherein said additive adheres to said first polymer particles thereby forming an adjunct dispersion wherein said additive is an aromatic acid or salt wherein said additive is selected from the group consisting of 2,3,4,4-tetrahydroxybutanoic acid, 1,2,3,4-butanetetracarboxylic acid and polystyrene sulfonic acid.

27. A capacitor comprising:
an anode,
a dielectric on said anode; and
a solid conductive polymer layer on said dielectric wherein said conductive polymer layer comprises first polymer particles having a positive Z-potential and second polymer particles having a negative Z-potential.

28. The capacitor of claim 27 wherein said first polymer particles have a charge of 10 mV to +150 mV and said second polymer particles have a charge of 0 mV to −150 mV.

29. The capacitor of claim 27 wherein said first polymer particles and said second polymer particles have a charge difference of at least 20 mV.

30. The capacitor of claim 27 wherein said first polymer particles and said second polymer particles have an average particle size of at least 5 nm.

31. The capacitor of claim 30 wherein said first polymer particles and said second polymer particles have an average particle size of at least 10 nm.

32. The capacitor of claim 31 wherein said first polymer particles and said second polymer particles have an average particle size of at least 50 nm.

33. The capacitor of claim 32 wherein said first polymer particles and said second polymer particles have an average particle size of 100-500 nm.

34. The capacitor of claim 33 wherein said first polymer particles and said second polymer particles have an average particle size of 100-200 nm.

35. The capacitor of claim 27 further comprising an additive wherein said additive adheres to said first polymer particles thereby forming an adjunct dispersion.

36. The capacitor of claim 35 wherein said adjunct dispersion comprises modified first polymer particles wherein said modified first polymer particles and said second particles have a charge difference of less than 20 mV.

37. The capacitor of claim 35 wherein said additive is an aromatic acid or salt.

38. The capacitor of claim 37 wherein said additive is selected from the group consisting of salicylic acid, phthalic acid, benzoic acid and styrene-4-sulfonic acid.

39. The capacitor of claim 27 having a working voltage of up to 500 V.

40. The capacitor of claim 39 having a working voltage of 3 V to 35 V.

41. A capacitor comprising:
an anode,
a dielectric on said anode; and
a conductive polymer layer on said dielectric wherein said conductive polymer layer comprises first polymer particles having a positive Z-potential and second polymer particles having a negative Z-potential further comprising an additive wherein said additive adheres to said first polymer particles thereby forming an adjunct dispersion wherein said additive is an aromatic acid or salt wherein said additive is selected from the group consisting of 2,3,4,4-tetrahydroxybutanoic acid, 1,2,3,4-butanetetracarboxylic acid and polystyrene sulfonic acid.

42. A capacitor comprising:
an anode,
a dielectric on said anode; and
a conductive polymer layer on said dielectric wherein said conductive polymer layer comprises first polymer particles having a positive Z-potential and second polymer particles having a negative Z-potential having a working voltage of 35 V to 500 V.

* * * * *

UNITED STATES PATENT AND TRADEMARK OFFICE
CERTIFICATE OF CORRECTION

PATENT NO. : 11,935,705 B2
APPLICATION NO. : 17/948437
DATED : March 19, 2024
INVENTOR(S) : Victor Andoralov et al.

It is certified that error appears in the above-identified patent and that said Letters Patent is hereby corrected as shown below:

In the Specification

Column 5, Line 7, "CTS centrifuge" should read "CPS centrifuge".

Signed and Sealed this
Thirtieth Day of April, 2024

Katherine Kelly Vidal
Director of the United States Patent and Trademark Office